United States Patent
Clarizio

(10) Patent No.: US 8,195,756 B2
(45) Date of Patent: Jun. 5, 2012

(54) METHOD AND COMPUTER PROGRAM PRODUCT FOR SENDING MESSAGES

(76) Inventor: Tony Vincent Clarizio, Millbury, MA (US)

( * ) Notice: Subject to any disclaimer, the term of this patent is extended or adjusted under 35 U.S.C. 154(b) by 126 days.

(21) Appl. No.: 12/766,877

(22) Filed: Apr. 24, 2010

(65) Prior Publication Data

US 2011/0179122 A1    Jul. 21, 2011

Related U.S. Application Data

(60) Provisional application No. 61/297,202, filed on Jan. 21, 2010.

(51) Int. Cl.
*G06F 12/00* (2006.01)
*G06F 15/16* (2006.01)

(52) U.S. Cl. ........................ 709/206; 709/207
(58) Field of Classification Search .................. 709/203, 709/205–207, 250
See application file for complete search history.

(56) References Cited

U.S. PATENT DOCUMENTS

| | | | |
|---|---|---|---|
| 2001/0029463 A1* | 10/2001 | Fuller | 705/12 |
| 2003/0083927 A1* | 5/2003 | Jaynes | 705/10 |
| 2003/0172127 A1* | 9/2003 | Northrup et al. | 709/219 |
| 2006/0080344 A1* | 4/2006 | McKibben et al. | 707/100 |
| 2007/0040027 A1* | 2/2007 | Morales | 235/386 |
| 2007/0214002 A1* | 9/2007 | Smith et al. | 705/2 |
| 2007/0233552 A1* | 10/2007 | Maggio | 705/12 |
| 2009/0006121 A1* | 1/2009 | Coughlin | 705/1 |
| 2009/0019373 A1* | 1/2009 | Abhyanker | 715/751 |
| 2010/0185641 A1* | 7/2010 | Brazier et al. | 707/758 |

* cited by examiner

*Primary Examiner* — Zarni Maung

(57) ABSTRACT

A method and computer program product includes displaying a plurality of recipient databases for enabling a user to select a recipient database. The recipient databases at least include contact names associated with elected offices and profiles of the contact names. Contact names contained within a selected recipient database are displayed for enabling the user to select at least one contact name from the recipient database to receive a message. A profile associated with a selected contact name is displayed. A plurality of communication templates is displayed for enabling the user to select a communication template for generating the message. A selected communication template is displayed for editing by the user. A plurality of delivery options is displayed for enabling the user to select a delivery option for the message.

17 Claims, 3 Drawing Sheets

METHOD AND COMPUTER PROGRAM PRODUCT FOR SENDING MESSAGES

CROSS-REFERENCE TO RELATED APPLICATIONS

The present Utility patent application claims priority benefit of the U.S. provisional application for patent Ser. No. 61/297,202 filed on Jan. 21, 2010 under 35 U.S.C. 119(e). The contents of this related provisional application are incorporated herein by reference for all purposes.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates generally to communications. More particularly, the invention relates to an online communication system for contacting elected officials of the United States.

BACKGROUND OF THE INVENTION

Registered voters in the United States have no easy approach to organize together with group consensus and get their message sent to the represented elected officials in a timely manner. Currently, voters must act alone and rely on searching for information about the officials in places such as newspapers or the Internet and must use traditional means of communication to contact these officials such as phone calls, letters and e-mail. It is therefore an objective of the present invention to provide an online communication system that gives users access to send a message with a group consensus on the same legislative subject. They will also have the benefit of obtaining information provided by elected officials pertaining to subjects such as, but not limited to, current legislation and the positions and platforms of the elected officials.

In view of the foregoing, there is a need for improved techniques for people to organize together and providing means for accessing information about United States elected officials and for contacting such officials.

BRIEF DESCRIPTION OF THE DRAWINGS

The present invention is illustrated by way of example, and not by way of limitation, in the figures of the accompanying drawings and in which like reference numerals refer to similar elements and in which.

Figure 1A:
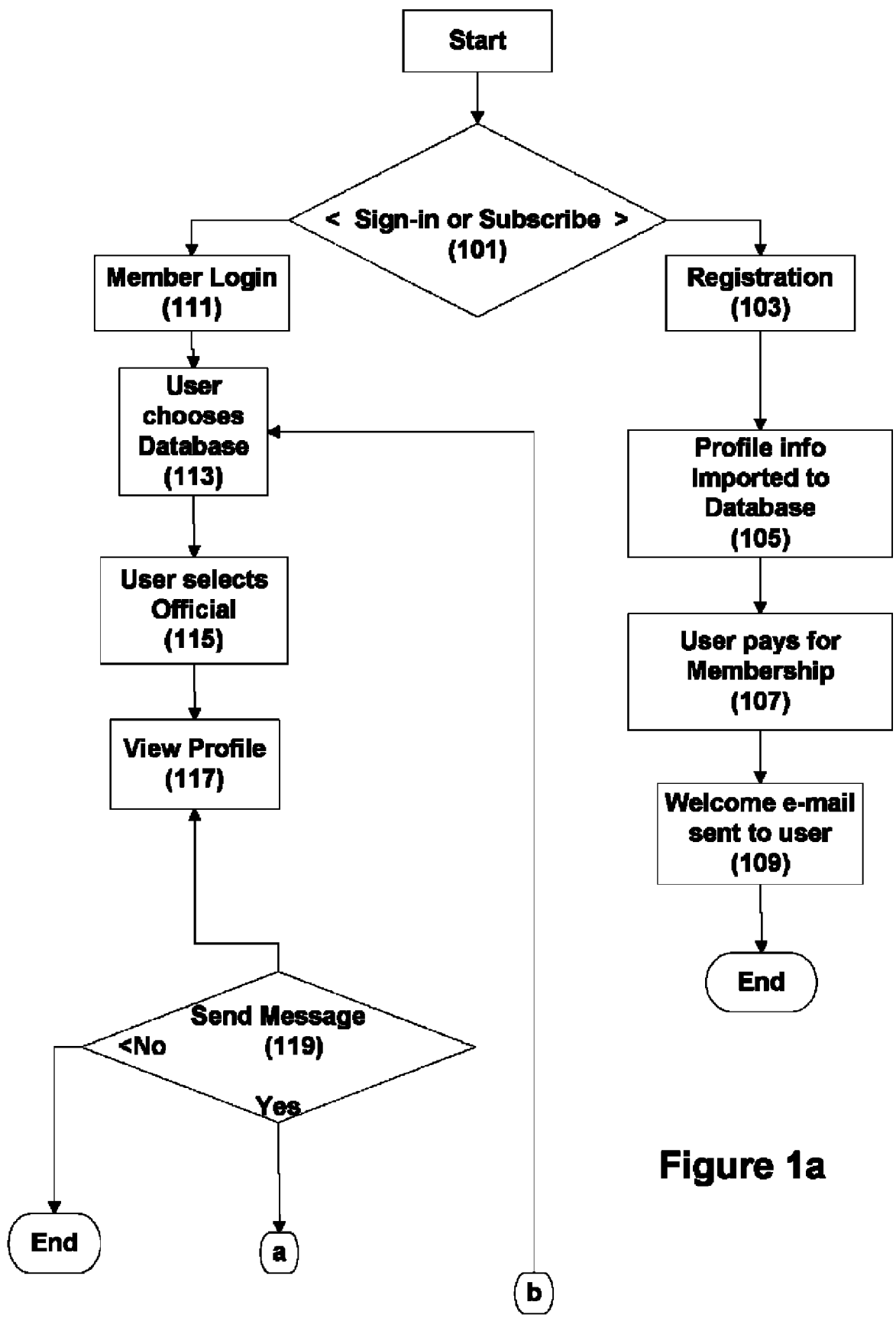
FIG. 1 is a flowchart illustrating an exemplary process for a communication system for accessing and contacting elected officials of the United States, in accordance with an embodiment of the present invention.

Unless otherwise indicated illustrations in the figures are not necessarily drawn to scale.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention will now be described in detail with reference to embodiments thereof as illustrated in the accompanying drawings.

Detailed descriptions of the preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

Preferred embodiments of the present embodiment provide an automatic communication system that enables users to organize together and send written messages to United States elected officials. Currently, United States registered voters have no easy approach to organize with an automated system to create and send messages that have a group consensus on a particular legislative issue and send to their United States elected officials. This is solved in preferred embodiments with an online communication system that provides access to pre-written messages on current legislation that reflect the positions of the users and provides the users with the ability to instantly print and e-mail the message to their represented United States elected official. Preferred embodiments can empower people with the ability to become organized and united as one voice through a software program to get their positions on current legislation heard by the United States elected officials who represent them in a timely manner.

Preferred embodiments of the present invention provide access to three databases, a database of current United States Elected Legislative Officials, a database of current United States Elected Educational Officials and a database of Current Legislative Elections. Preferred embodiments provide the ability to instantly create custom messages with the sender address, recipient address and message text information automatically filled in and ready for print and e-mail functionality to give users an easy and efficient method for contacting United States elected officials. Preferred embodiments provide members with access to pre-written message templates that reflect their current position on legislation without the need to spend time or trouble of writing their own message. Furthermore, in preferred embodiments, members receive instant notification to their e-mail addresses when the system database has been updated with a new pre-written message template.

Figure 1B:
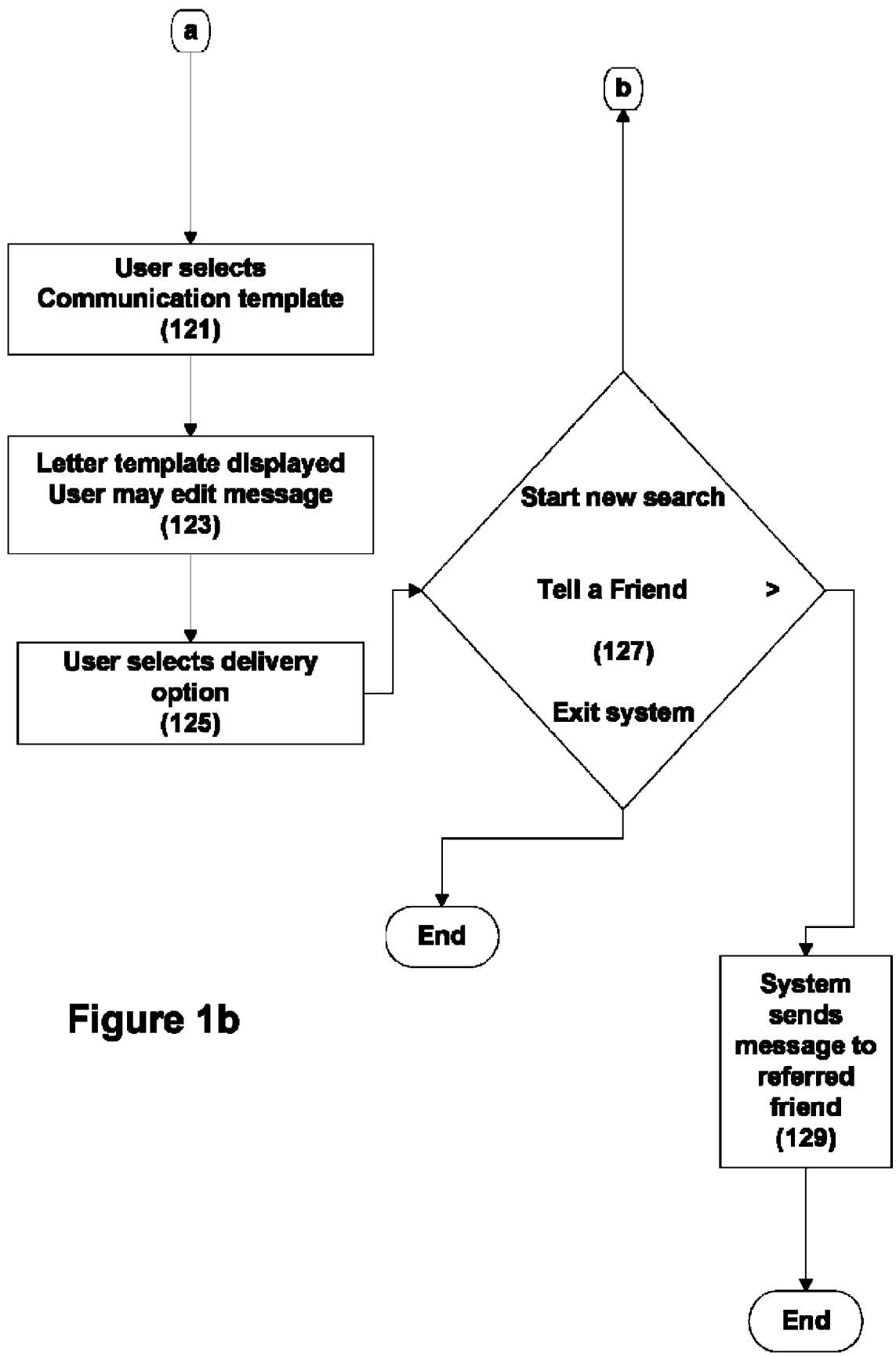

FIG. 1 is a flowchart illustrating an exemplary process for a communication system for accessing and contacting elected officials of the United States, in accordance with an embodiment of the present invention. In the present embodiment, the process begins at step 101, which displays a welcome page where a choice is given to either sign in to the system or become a member and use the system. The welcome page may also display information about the system such as, but not limited to, the name of the system, a mission statement, etc. If the user wishes to become a member to the system, the process goes to step 103 where the user registers with the system. The type of person who would seek this type of service would be anyone over the age of 18 who wants to be involved in the legislative process and have their views heard by the elected officials that represent them. Membership registration is the initial step of signing up for the communication system and enables the user to register and choose a user name and password. The user also fills out a personal profile including information such as, but not limited to, name, address, e-mail address, birthday, phone number, political affiliation, voting district, etc. This profile is then imported into a member database in step 105. The member database comprises profile information that is obtained from the members' registration processes. This database is set up within the communication system to be accessed and used by the software program to perform the function of creating the automated message template for selected recipients. In order to complete the registration, the user pays for the membership through a payment link to a business merchant account in step 107. In alternate embodiments where the system may be used for free, this step may be omitted. In the present embodiment, once registration is complete, the system sends a welcome e-mail message with member profile information to the user in step 109. This e-mail message may also include, without limitation, instructions on how to access and use the system. The registration process then ends.

In step 101 if the user is already registered with the system, the user may choose to sign into the system. In step 111 a registered member is allowed to access the communication system by logging in with a personal username and password. Once logged in the user chooses which recipient database he would like to access in step 113. This is the first step of using the communication program. In the present embodiment, there are three databases to choose from: a current elected legislative official's database, a current elected educational official's database and a current legislative elections database. In alternate embodiments, additional databases may be available and one or more of the databases available in the present embodiment may be omitted. In the present embodiment, the current elected legislative official database comprises profile information on current elected legislative officials. The current elected educational official database comprises profile information for current elected educational officials. The current legislative elections database comprises profile information about current candidates running for elected office in current legislative elections. The profile information about the elected officials contained in the databases include information such as, but not limited to, name, office, address, e-mail address, phone number, political affiliation, district, etc. These databases are set up within the communication system to be accessed and used by the software program to perform the membership service of creating the automated message template for the selected recipients. The databases are separated into categories to make the addition of more databases to system more clear for ease of use and understanding by user. Additional database could include but not limited to: U.S. Judges, Town Committee, etc. From this point the process is the same no matter which database is chosen.

In step 115, the user selects the elected official, aka, recipient, that they would like to access or contact. In order to do this, the user is asked two questions. The user is first asked what elected office the official holds. Then, the user is asked what state the official is representing. This information draws all qualifying name(s) of elected officials from the selected database. Along with the qualifying name(s), this list may also provide general information about the officials listed such as, but not limited to, the county, city, district or school district that they represent, political affiliation, etc. The user may then select the desired official from this list of qualifying names. At this point in step 117, the user can view the profile of the selected official's public information, which is stored in the database selected in step 113. In step 119 the user has the option of contacting the elected official. If the user chooses not to contact the official, the process ends. If the user wishes to contact the official, the user is prompted to select a communication message template in step 121. In the present embodiment, the user is able to choose between a blank message template or from pre-written custom messages on specific legislation from a message template database. The message template database comprises the message template information for all of the pre-written messages and the blank message. If there are any updates to pre-written message templates within the message template database, the system sends an e-mail about this update to the members in the member database. The communication system is programmed to send all current members an e-mail notification of the name of message template that has been added to the message template database. This allows for quick response to notify elected officials of the position of users of this system. This database is set up within the communication system to be accessed and used by the software program to perform the membership service of creating messages for selected recipients. In alternate embodiments different types of message templates may be available based on current legislative issues that need to be addressed from United States voters.

In the present embodiment once a message template is chosen, a letter template is created where the personal information of the user is automatically imported from the member database as the sender information and the information of the official is automatically imported from the selected database as the recipient. In step 123, the letter template is displayed with this imported information to the user along with other information such as, but not limited to, a letterhead, the pre-written message if chosen, etc. The user may then edit this letter template for example, without limitation, by writing a custom message in the blank message template or editing the wording of a pre-written message if desired. Once the user finishes editing the letter template, the user is shown a preview of the completed letter and then chooses a delivery method in step 125. In the present embodiment, the user has the option to print or e-mail the message. The user also has the option to save the letter onto their computer system. If the user chooses to e-mail the message, the e-mail message is sent and copied to the member's e-mail address, which is obtained from the member database. If the user chooses to print the message, the user then chooses the envelope type in which to send the letter. In the present embodiment, the user has three options for letter text alignment for the selected envelope type for example, without limitation, a regular envelope on which all address information is printed, a single window envelope on which sender address information is printed and a double window envelope on which no address information is needed. In alternate embodiments different envelope printing settings may be available for example, without limitation, settings for envelopes of different size, etc. In step 127 of the present embodiment, the user continues to the last step of using communication system. On the final page of the system, the user is presented with three options: telling a friend about the service, beginning a new search or exiting the system. If the user decides to tell a friend about the service, the system sends a message to the e-mail address of the referred friend in step 129 and the process ends. The user may refer multiple people to the system in this step. If the user decides to begin a new search, the process returns to step 113 where the user begins the process of choosing another official to access their profile or contact. If the user decides to exit the system, the process ends and they are taken back to the welcome page.

Those skilled in the art will readily recognize, in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

Figure 2:
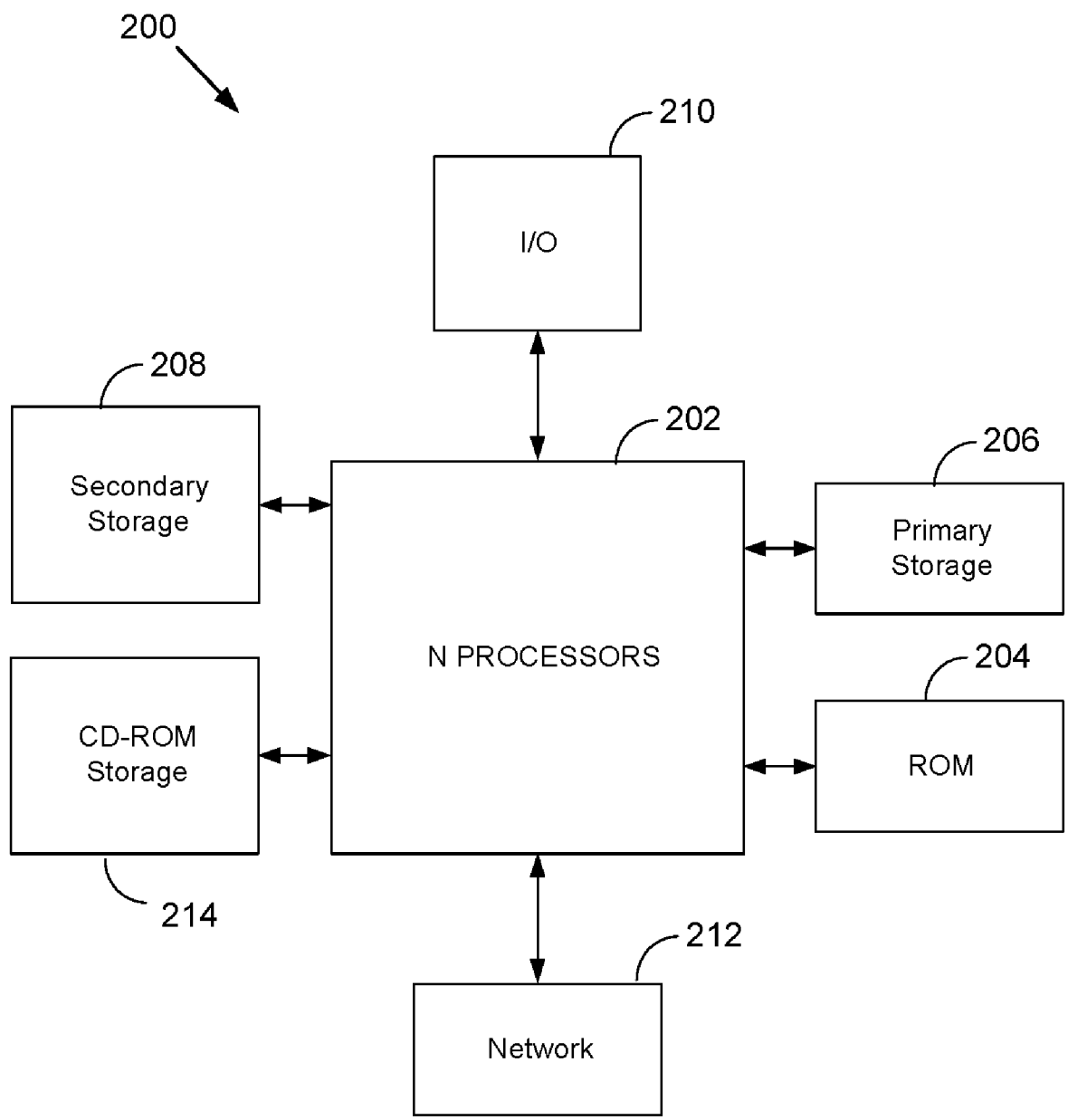
FIG. 2 illustrates a typical computer system that, when appropriately configured or designed, can serve as a computer system in which the invention may be embodied.

FIG. 2 illustrates a typical computer system that, when appropriately configured or designed, can serve as a computer system in which the invention may be embodied. The computer system 200 includes any number of processors 202 (also referred to as central processing units, or CPUs) that are coupled to storage devices including primary storage 206 (typically a random access memory, or RAM), primary storage 204 (typically a read only memory, or ROM). CPU 202 may be of various types including microcontrollers (e.g., with embedded RAM/ROM) and microprocessors such as programmable devices (e.g., RISC or SISC based, or CPLDs and FPGAs) and unprogrammable devices such as gate array ASICs or general purpose microprocessors. As is well known in the art, primary storage 204 acts to transfer data and instructions uni-directionally to the CPU and primary storage 206 is used typically to transfer data and instructions in a bi-directional manner. Both of these primary storage devices may include any suitable computer-readable media such as those described above. A mass storage device 208 may also be coupled bi-directionally to CPU 202 and provides additional data storage capacity and may include any of the computer-readable media described above. Mass storage device 208 may be used to store programs, data and the like and is typically a secondary storage medium such as a hard disk. It will be appreciated that the information retained within the mass storage device 208, may, in appropriate cases, be incorporated in standard fashion as part of primary storage 206 as virtual memory. A specific mass storage device such as a CD-ROM 214 may also pass data uni-directionally to the CPU.

CPU 202 may also be coupled to an interface 210 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 202 optionally may be coupled to an external device such as a database or a computer or telecommunications or internet network using an external connection as shown generally at 212, which may be implemented as a hardwired or wireless communications link using suitable conventional technologies. With such a connection, it is contemplated that the CPU might receive information from the network, or might output information to the network in the course of performing the method steps described in the teachings of the present invention.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing novel means for and/or steps described that the applications designer will selectively decide, depending upon the practical considerations of the particular implementation, to carry out and/or locate within the jurisdiction of the USA. For any claims construction of the following claims that are construed under 35 USC §112 (6) it is intended that the corresponding means for and/or steps for carrying out the claimed function also include those embodiments, and equivalents, as contemplated above that implement at least some novel aspects and objects of the present invention in the jurisdiction of the USA. For example, any jurisdiction or geographical area where it is necessary or convenient for people as a group consensus to contact a particular person(s) who has authority to make decisions that effect a large amount of people may be performed and/or located outside of the jurisdiction of the USA while the remaining method steps and/or system components of the forgoing embodiments are typically required to be located/performed in the US for practical considerations.

Having fully described at least one embodiment of the present invention, other equivalent or alternative methods of providing an automatic communication system according to the present invention will be apparent to those skilled in the art. The invention has been described above by way of illustration, and the specific embodiments disclosed are not intended to limit the invention to the particular forms disclosed. For example, the particular implementation of the communication system may vary depending upon the particular type of communication. The communication systems described in the foregoing were directed to political implementations involving United States elected officials; however, similar techniques are to implement automatic communication systems for contacting other types of officials such as, but not limited to, non-elected or appointed officials and locally elected officials. Furthermore, automatic communication systems may be implemented for non-political purposes such as, but not limited to, facilitating communication between parents and teachers, employees and employers, consumers and businesses, etc. Non-political implementations of the present invention are contemplated as within the scope of the present invention. The invention is thus to cover all modifications, equivalents, and alternatives falling within the spirit and scope of the following claims.

Claim elements and steps herein have been numbered and/or lettered solely as an aid in readability and understanding. As such, the numbering and lettering in itself is not intended to and should not be taken to indicate the ordering of elements and/or steps in the claims.

What is claimed is:

1. A method, executed on one or more processors, consisting of the steps of:
    registering a user for sending communications to contact names, said registering consisting of obtaining a user profile of the user and a registration fee;
    displaying at least three databases for user selection, each of the databases at least comprising contact names associated with elected offices and profiles of the contact names;
    displaying contact names contained within a selected database for the user to select at least one contact name and view an associated profile;
    displaying a plurality of communication templates for user selection for generating a message;
    displaying a selected communication template for editing by the user; and
    displaying a plurality of message delivery options for user selection;
    displaying a plurality of formatting options for a selected delivery option of printing the message, the formatting options being based, at least in part, on envelope types for the printed message;
    displaying an option of saving the message in which the message is saved on the user's local non-transitory storage device; and
    displaying an option to refer one or more additional users for registration.

2. A method, executed on one or more processors, comprising the steps of:
    displaying a plurality of recipient databases for enabling a user to select a recipient database, the recipient databases at least comprising contact names associated with elected offices and profiles of the contact names;
    displaying contact names contained within a selected recipient database for enabling the user to select at least one contact name from the recipient database to receive a message;
    displaying a profile associated with a selected contact name;
    displaying a plurality of communication templates for enabling the user to select a communication template for generating the message;
    displaying a selected communication template for editing by the user; and
    displaying a plurality of delivery options for enabling the user to select a delivery option for the message;
    displaying a plurality of formatting options for a selected delivery option of printing the message, the formatting options being based, at least in part, on envelope types for the printed message; and
    displaying an option of saving the message in which the message is saved on the user's local non-transitory storage device.

3. The method as recited in claim 2, further comprising the step of enabling the user to refer one or more additional users.

4. The method as recited in claim 3, further comprising the step of communicating with the one or more users.

5. The method as recited in claim 4, wherein the communicating comprises sending email to the one or more additional users to invite them to send messages.

6. The method as recited in claim 2, further comprising the step of registering a user for sending communications to contact names.

7. The method as recited in claim 6, wherein the registering comprises obtaining a user profile of the user.

8. The method as recited in claim 7, wherein the displayed selected communication template includes at least part of the user profile.

9. The method as recited in claim 2, wherein one of said plurality of delivery options comprises automatic emailing of the message to the selected contact name.

10. A non-transitory computer-readable storage medium with an executable program stored thereon, wherein the program instructs a processor to perform the following steps:
    display a plurality of recipient databases for enabling a user to select a recipient database, the recipient databases at least comprising contact names associated with elected offices and profiles of the contact names;
    display contact names contained within a selected recipient database for enabling the user to select at least one contact name from the recipient database to receive a message;
    display a profile associated with the a selected contact name;
    display a plurality of communication templates for enabling the user to select a communication template for generating the message;
    display a selected communication template for editing by the user; and
    display a plurality of delivery options for enabling the user to select a delivery option for the message;
    displaying a plurality of formatting options for a selected delivery option of printing the message, the formatting options being based, at least in part, on envelope types for the printed message; and
    displaying an option of saving the message in which the message is saved on the user's local non-transitory storage device.

11. The program instructing the processor as recited in claim 10, further comprising instructions for enabling the user to refer one or more additional users.

12. The program instructing the processor as recited in claim 11, further comprising instructions for communicating with the one or more users.

13. The program instructing the processor as recited in claim 12, wherein the communicating comprises sending email to the one or more additional users to invite them to send messages.

14. The program instructing the processor as recited in claim 10, further comprising instructions for registering a user for sending communications to contact names.

15. The program instructing the processor as recited in claim 14, wherein the registering comprises obtaining a user profile of the user.

16. The program instructing the processor as recited in claim 15, wherein the displayed selected communication template includes at least part of the user profile.

17. The program instructing the processor as recited in claim 10, wherein one of said plurality of delivery options comprises automatic emailing of the message to the selected contact name.

\* \* \* \* \*